United States Patent
Horng et al.

(10) Patent No.: US 6,726,455 B2
(45) Date of Patent: Apr. 27, 2004

(54) FAN HAVING A HEAT SENSOR DEVICE

(75) Inventors: Alex Horng, Kaohsiung (TW);
Mei-Ying Hsiao, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 46 days.

(21) Appl. No.: 10/255,707

(22) Filed: Sep. 27, 2002

(65) Prior Publication Data

US 2004/0062666 A1 Apr. 1, 2004

(51) Int. Cl.[7] ............................. F04B 35/04; H05K 7/20
(52) U.S. Cl. ................. 417/14; 417/423.1; 417/423.15; 361/697; 165/121; 165/80.3
(58) Field of Search ..................... 417/423.1, 423.15, 417/54, 14, 32; 361/695, 697, 702; 165/80.3, 121, 122, 186

(56) References Cited

U.S. PATENT DOCUMENTS 6,053,242 A * 4/2000 Hsieh .......................... 165/121
6,587,341 B1 * 7/2003 Wei ............................. 361/695
6,616,422 B2 * 9/2003 Hsieh .......................... 417/354
2003/0161103 A1 * 8/2003 Wrycraft et al. ............. 361/695
2003/0227748 A1 * 12/2003 Chen et al. .................. 361/695

* cited by examiner

Primary Examiner—Charles G. Freay
(74) Attorney, Agent, or Firm—Bacon & Thomas, PLLC

(57) ABSTRACT

The inventive fan includes a frame having a hub defining an aperture and a fan unit received in the frame. The fan unit has an air impeller rotatably supported by the hub and a circuitry adapted to adjust the rotational speed of the air impeller. The heat sensor extends from the fan unit to the heat sink through the aperture of the hub, and sends a signal indicative of the precise temperature of the heat sink to the circuitry for the adjustment of the rotational speed of the air impeller. As a result, the rotational speed of the air impeller can be changed upon the precise temperature of the heat sink detected by the heat sensor.

9 Claims, 4 Drawing Sheets

FAN HAVING A HEAT SENSOR DEVICE

BACKGROUND OF THE INVENTION

1. Field of the Invention

The present invention relates to a fan with a heat sink and, more particularly, to a fan having a heat sensor which extends to a heat sink so as to detect the precise temperature of the sink and enable the rotational speed of the air impeller to be adjusted upon the change of the temperature.

2. Description of Related Art

A speed adjustable fan provided with a speed control circuit of a printed circuit board and a heat sensor attached thereto is known. The printed circuit board is arranged in a parallel configuration with a frame while the heat sensor detecting ambient temperature at an air outlet. Moreover, the heat sensor is capable of extending to a heat source of an operative system to thereby detect the temperature generated thereon.

As shown in FIG. 1, the fan 1 includes a frame 10 defining an air inlet 11 and an air outlet 12, with an air impeller (not numbered) received in the frame 10 between the inlet 11 and the outlet 12. Furthermore, the fan 1 is provided with a heat sensor 13 that extends in a manner parallel to the frame 10 at the air outlet 12 in order to detect the ambient temperature where the sensor 13 is disposed.

Whenever the temperature becomes higher or lower, the heat sensor 13 generates a signal which adjusts the rotational speed of the air impeller corresponding to the detected temperature, i.e. makes the speed faster or slower in response to the change of the ambient temperature around the sensor 13.

With the conventional fan, however, a problem rises that the rotational speed of the air impeller can not be adjusted to meet a excellent speed necessary for a heat source to be blown on, because the heat sensor 13 can not detect the precise temperature of the heat source but the ambient temperature of airflow at the outlet 12 of the frame 10.

OBJECTS OF THE INVENTION

The object of the present invention is to provide a fan having a heat sensor arranged below a hub of an impeller proximal a heat source to thereby detect the precise temperature.

Another object of the present invention is to provide a fan having a heat sensor arranged below a hub of an impeller through a sensing aperture proximal a heat source which is simplified both in manufacture and in assembly.

SUMMARY OF THE INVENTION

The present invention provides a fan having a heat sensor adapted to detect the precise temperature of a heat source to be blown on. The inventive fan includes a frame, an air impeller and a heat sensor. The frame accommodates the rotary air impeller. The heat sensor is positioned below a hub of the air impeller and extends to an area proximal the heat source, so as to detect the precise temperature and thereby adjust the rotational speed of the air impeller up on the change of the temperature.

Other objects, advantages and novel features of this invention will become more apparent from the following detailed description when taken in conjunction with the accompanying drawings.

DETAILED DESCRIPTION OF THE PREFERRED EMBODIMENT

The present invention is now to be described in detail below by way of preferred embodiments.

Figure 1:
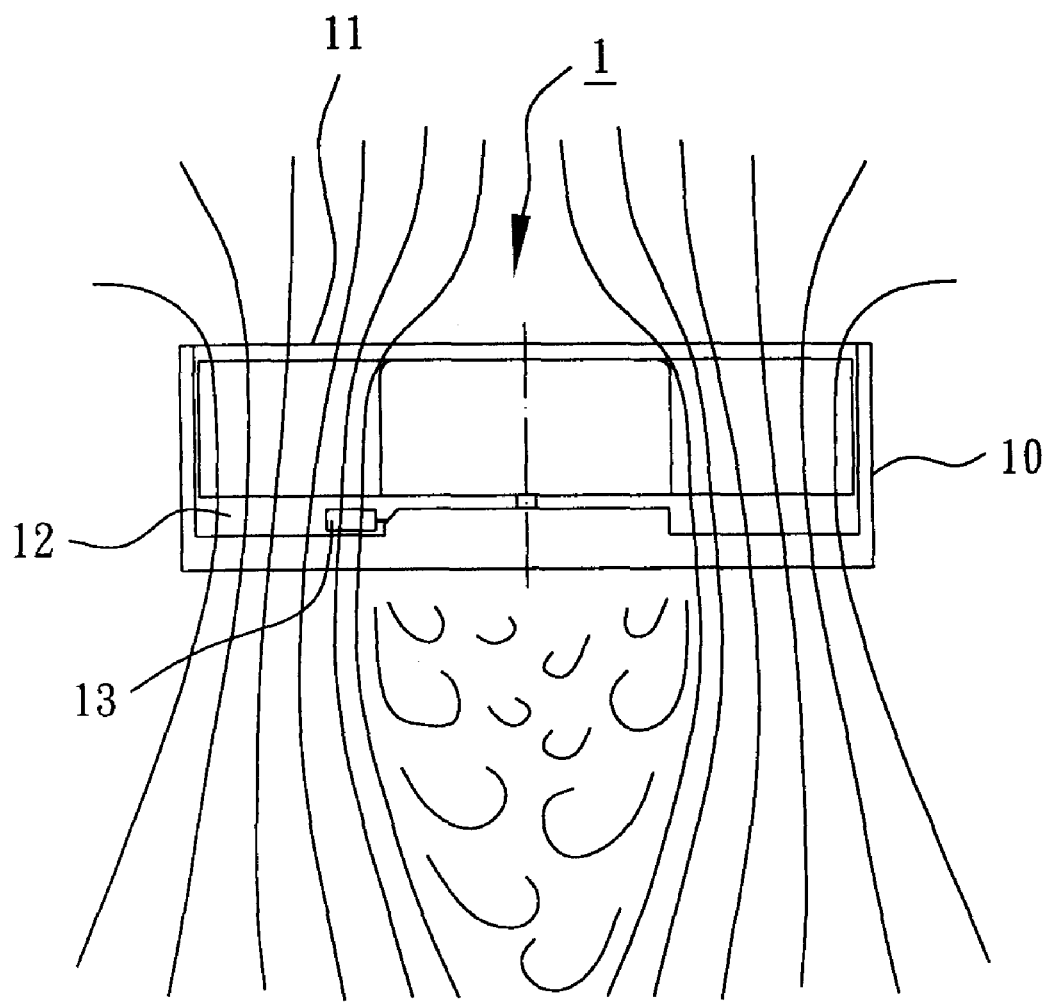
FIG. 1 is a schematic view of a conventional fan provided with a heat sensor.
Figure 2:
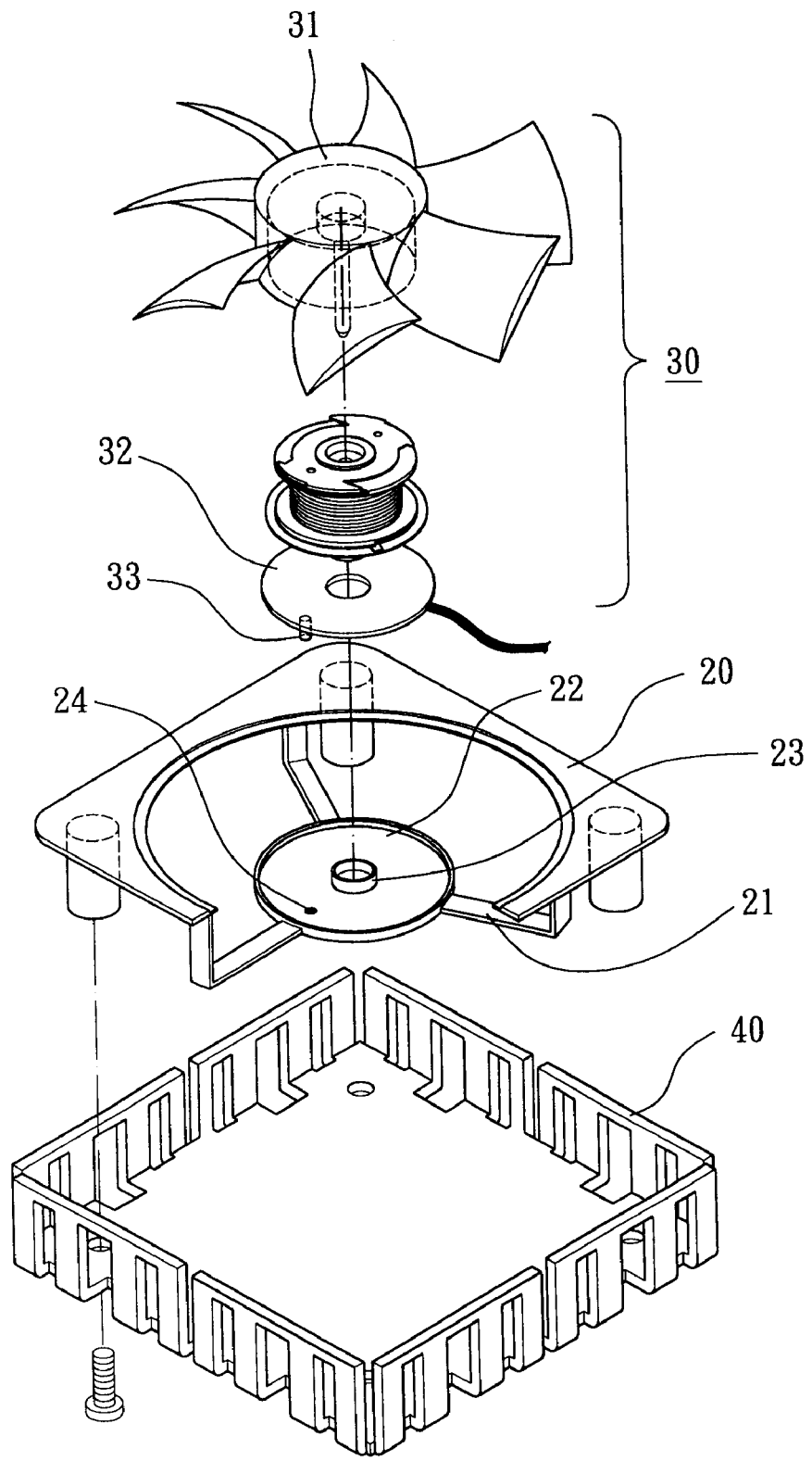
FIG. 2 is an exploded perspective view of a first preferred embodiment of a fan in accordance with the present invention.

FIG. 2 shows an exploded perspective view of a first preferred embodiment of a fan in accordance with the present invention. The inventive fan includes a frame 20 having a hub 22 supported therein by a plurality of struts 21, with an axial hole 23 formed on and an aperture 24 defined on the hub 22 in place.

A fan unit 30 received in the frame 20 comprises an air impeller 31 rotatably supported on the hub 22 by means of a spindle extending through the hole 23. Preferably, the fan unit 30 is suspended from the hub 22 of the frame 20. The fan unit 30 further has a circuit board 32 situated between the air impeller 31 and a heat sink 40 that is intended to be blown on by the impeller 31. The circuit board 32 is formed with a circuitry (not shown) adapted to adjust the rotational speed of the air impeller 31.

Figure 4:
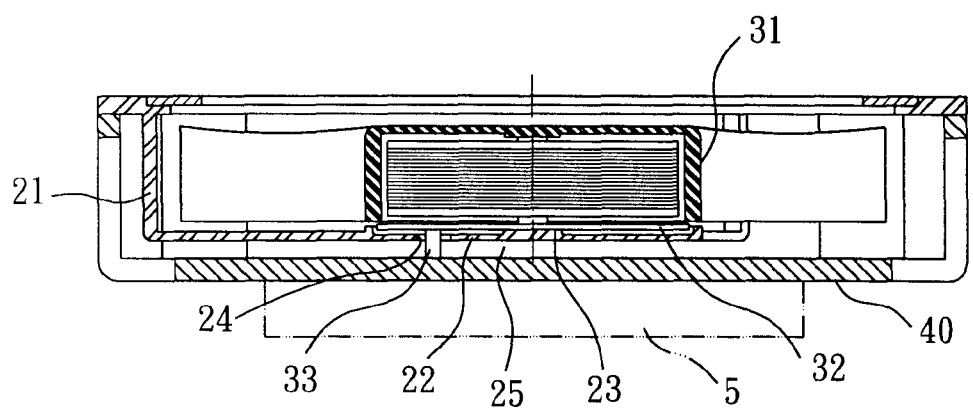
FIG. 4 is a cross-sectional view taken along lines 3—3 in FIG. 3.

For purpose of detecting the precise temperature, a heat sensor 33 is extended from the circuit board 32 of the fan unit 30 to the heat sink 40 through the aperture 24 of the hub 22 aligned with a heat source, as best shown in FIG. 4. Accordingly, the heat sensor 33 is positioned below the hub 22 of the frame 20 in assembled relationship. For simplifying the entire structure the heat sensor 33 is mechanically and electrically connected to the circuit board 32, and then extended to the heat source. Preferably, the heat sink 40 is contacted with the heat sensor 33 for directly conducting the precise temperature.

As the temperature of the sink 40 becomes higher or lower, the heat sensor 33 sends a signal indicative of the precise temperature of the sink 40 to the circuitry of the circuit board 33 thereby adjusting the rotational speed of the impeller 31 upon the precise temperature of the heat sink 40.

Figure 3:
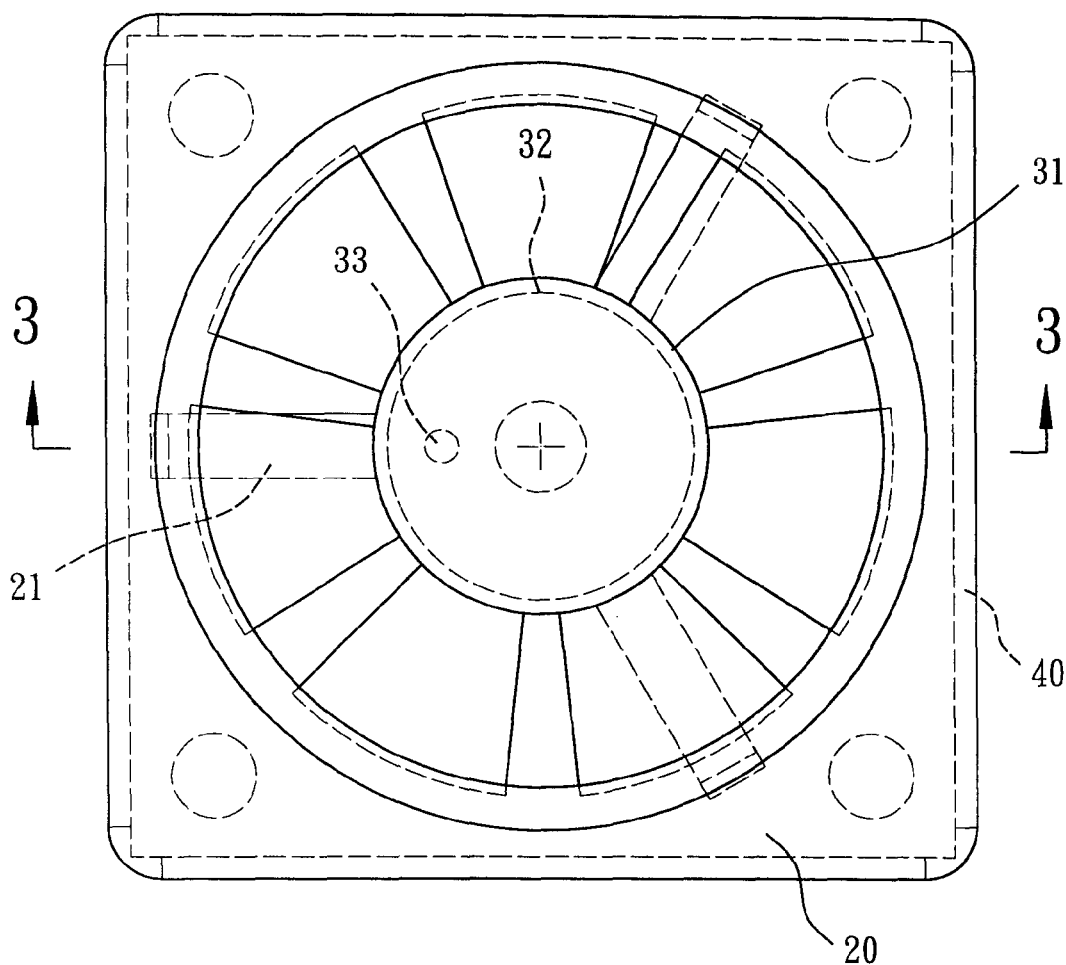
FIG. 3 is a top view of the fan of FIG. 2.

FIG. 3 shows a top view of the inventive fan shown in FIG. 2. The heat sensor 33, disposed with other necessary electronic components of the circuit, is preferably formed on the circuit board 32 and is electrically connected to the circuitry. This surely simplifies the fan in manufacture and assembly.

FIG. 4 shows a cross-sectional view taken along lines 3—3 in FIG. 3. The heat sink 40 is made of a thermally conductive material and is attached to a heat source 5 (shown in broken line), such as a CPU (Central Processing Unit). Then, an area of the heat sink 40 proximal the heat source 5 is at the substantially same temperature as the source 5.

In the inventive fan, the heat sensor 33 is in contact with the heat sink 40. On the other hand, the arrangement of the sensor 33 in a narrow gap 25 between the hub 22 and the heat sink 40 eliminates any negative influence resulting from air flowing outside the gap 25. In this manner the sensor 33 can detect the precise temperature of the sink 40, so that the rotational speed of the impeller 31 can be changed upon the precise temperature of the heat sink 40 attached to the heat source 5.

Figure 5:
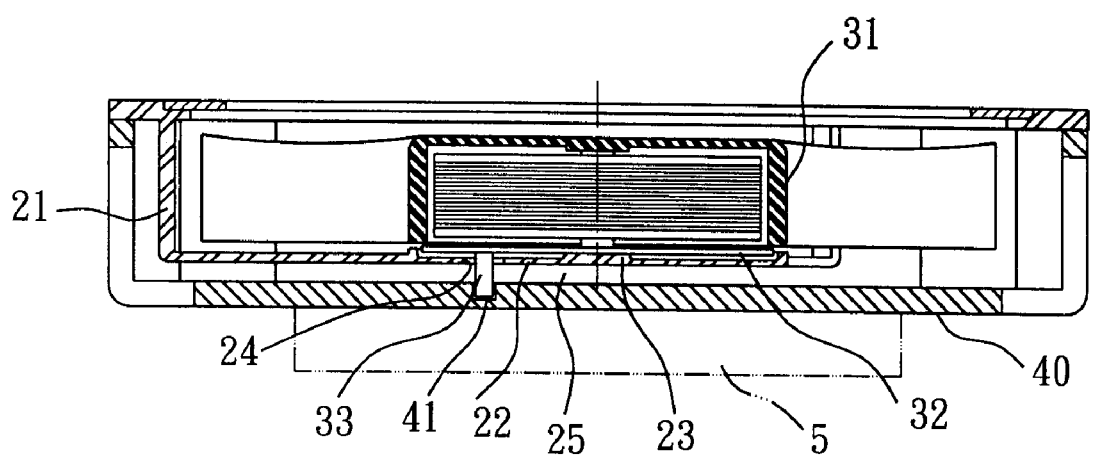
FIG. 5 is a cross-sectional view of a second preferred embodiment of the inventive fan.

FIG. 5 shows a cross-sectional view of a second preferred embodiment of the inventive fan, with the same numerals as designated in the first embodiment representing the same elements.

This embodiment is substantially similar to the aforementioned first embodiment except that the heat sink 40 now has an additional hole 41 in the form either of a blind hole or a through-hole for receiving a distal end of the heat sensor 33 adapted to detect precise temperature. The hole 41 is preferably is aligned with the aperture 24 of the hub 22 of the frame 20 to the benefit of the assembly of the inventive fan.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A fan, comprising:

a frame having a hub defining an aperture;

a fan unit received in said frame, said fan unit having an air impeller rotatably supported by said hub and a circuitry adapted to adjust a rotational speed of said air impeller; and a heat sensor extending from said fan unit to a heat source through said aperture of said hub, and sending a signal indicative of precise temperature of said heat source to said circuitry to thereby adjust said rotational speed of said air impeller;

whereby said rotational speed of said air impeller may be changed upon said precise temperature of said heat source detected by said heat source.

2. The fan as claimed in claim 1, wherein said heat sensor extends from said fan unit at a location below said hub.

3. The fan as claimed in claim 1, wherein said fan unit has a circuit board formed with said circuitry electrically connected to said heat sensor.

4. The fan as claimed in claim 1, wherein said heat sensor extends from said circuit board and is electrically connected to said circuitry.

5. The fan as claimed in claim 1, further comprises a heat sink attached to said heat source, and wherein said heat sensor is in contact with said heat sink.

6. The fan as claimed in claim 5, wherein said heat sink has a hole define therein for receiving a distal end of said heat sensor.

7. The fan as claimed in claim 6, wherein said hole of said heat sink is aligned with said aperture of said hub of said frame.

8. The fan as claimed in claim 6, wherein said hole is a blind hole.

9. The fan as claimed in claim 6, wherein said hole is a through-hole.

* * * * *